United States Patent [19]
Sharpe

[11] 3,737,182
[45] June 5, 1973

[54] ANCHORAGE DEVICES

[75] Inventor: John William Sharpe, Sutton Coldfield, England

[73] Assignee: Joseph Lucas (Industries) Limited, Birmingham, England

[22] Filed: June 28, 1971

[21] Appl. No.: 157,530

[30] Foreign Application Priority Data
July 23, 1970 Great Britain.....................35,696/70

[52] U.S. Cl..................................287/86, 24/257 R
[51] Int. Cl................................................F16b 7/04
[58] Field of Search ..................287/86, 78; 248/204, 248/50, 54 R; 339/256 S; 24/257 R, 123.5 F

[56] References Cited
UNITED STATES PATENTS
2,706,611 4/1955 Kimball..............................148/204
2,050,559 8/1936 Budnick................................248/50

FOREIGN PATENTS OR APPLICATIONS
1,056,949 2/1967 Great Britain......................248/54 R Primary Examiner—Andrew V. Kundrat
Attorney—Holman & Stern

[57] ABSTRACT

An anchorage device particularly but not exclusively for attaching a window panel to a flexible drive rack is formed from resilient material, for example wire and includes a helically wound portion within which a helically ribbed drive member is received. At opposite ends of the helically wound portion are a pair of outwardly extending limbs which are integral with the helically wound portion and which in use are bolted to the components in question to secure the flexible drive member to the component.

1 Claim, 3 Drawing Figures

PATENTED JUN 5 1973          3,737,182

INVENTOR
John William Sharpe

ANCHORAGE DEVICES

BACKGROUND OF THE INVENTION

This invention relates to anchorage devices for attaching a flexible drive member having a helically ribbed outer surface to a component to be driven.

SUMMARY OF THE INVENTION

A device according to the invention is formed from resilient material and includes a helically wound portion within which the drive member is received and a pair of outwardly extending limbs integral with opposite ends respectively of the helically wound portion, through which the device can be secured to the component to be driven.

Preferably the device is formed from spring steel wire, and the limbs are so disposed with respect to the helically wound portion that the device has to be flexed in order for the limbs to be secured to the component to be driven, the limbs being disposed so that this flexure results in a reduction in the diameter of the helically wound portion so that said portion grips said drive member.

Desirably, the limbs are so arranged that a line passing through the points at which the limbs are to be secured to the component to be driven extends at right angles to the axis of said helically wound portion.

The invention further resides in a method of attaching a flexible drive member having a helically ribbed surface to a component to be driven, including the steps of engaging the drive member in a helically wound portion of an anchorage device with the helical rib of the drive member extending between the convolutions of said portion of said device, and securing a pair of limbs integral with opposite ends respectively of said portion to said component to be driven.

One example of the invention is illustrated in the accompanying drawings wherein,

DETAILED DESCRIPTION OF THE INVENTION

Figure 1:
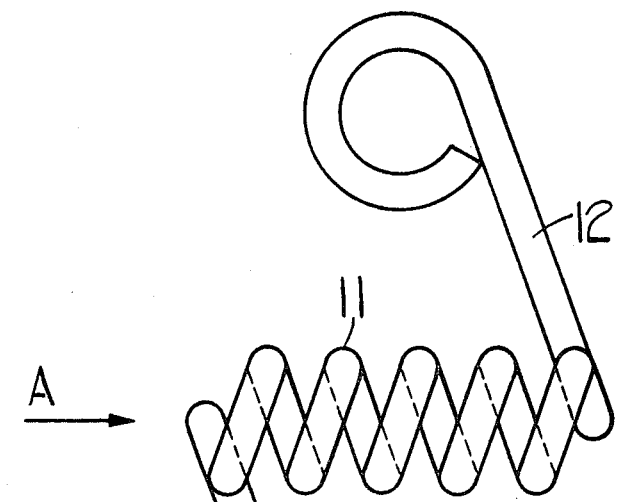
FIG. 1 is a plan view of an anchorage device.
Figure 2:
FIG. 2 is a view in the direction of arrow A in FIG. 1.

Referring to the drawings, the anchorage device is formed from a single length of spring steel wire which is shaped to define a helically wound portion 11 having a pair of outwardly extending limbs 12, 13 at opposite ends thereof respectively. The free end of each of the limbs 12, 13 is shaped to define a loop, and the arrangement of the limbs 12, 13 with respect to the portion 11 is such that when the device is viewed from one end (FIG. 2), the limbs 12, 13 are displaced laterally from the portion 11, and subtend there between an angle of approximately 170°, with the limbs 12, 13 being arranged with the portion 11 lying within the 170° arc between the limbs 12, 13. Moreover, the portion 11 is so wound that if the device is flexed so that the limbs 12, 13 lie in the same plane, then the flexure of the device results in a reduction in the diameter of the helically wound portion 11.

Figure 3:
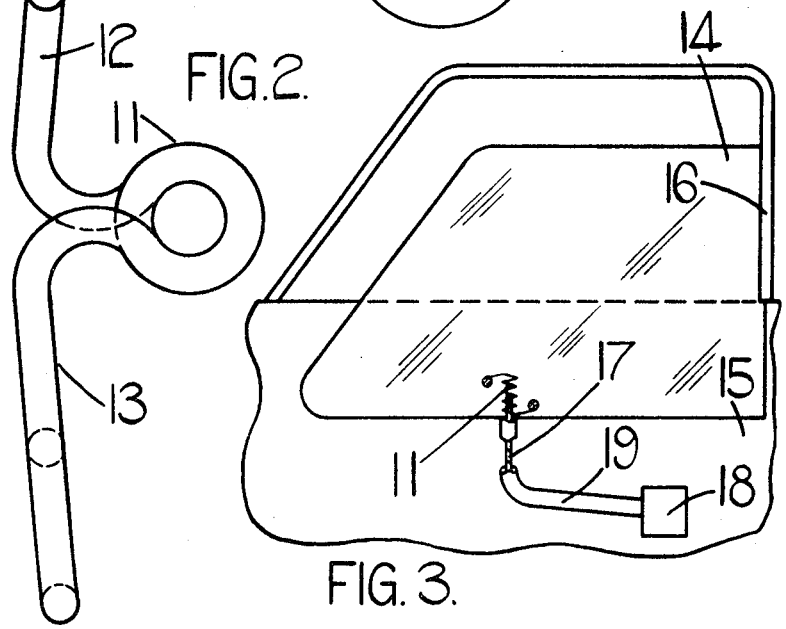
FIG. 3 is a partly diagrammatic representation of one use of the device shown in FIGS. 1 and 2.

The device is particularly intended for securing a flexible drive member of the kind having a helically ribbed outer surface, to a slidable panel for example, a vehicle window, so that longitudinal movement of the drive member is transmitted to the slidable panel to cause the panel to slide. In one embodiment of the device (FIG. 3), the device is used to secure a flexible drive member 17 to a vehicle window 14, the window 14 being slidable relative to a door 15 of a vehicle in guides 16 secured to the door. The flexible drive member is in the form of a central steel wire core having a further steel wire wound there around so that said further steel wire extends in a helical path along the length of the core. Thus, said further steel wire defines a helically ribbed surface on the drive member.

In order to secure the drive member 17 to the window 14, the drive member is engaged with the device 11, so that the helical rib of the drive member defined by said further wire lies between the convolutions of the helically wound portion 11 of the device. The diameter of the convolutions of the portion 11 of the device is substantially equal to the diameter of the drive member, so that when the drive member and the device are assembled, then axial movement of the drive member relative to the device is resisted by the engagement of the convolutions of the portion 11 of the device with the ribbed surface of the drive member. The limbs 12, 13 of the device are then secured to the window 14 by bolts passing through the loops at the free ends of the limbs, and corresponding holes in the window 14. When the bolts are tightened, the device is flexed so that the limbs 12, 13 lie in a plane parallel to the plane of the window. Thus, as described above, the diameter of the portion 11 of the device is reduced, thereby gripping the drive member tightly. It will be appreciated, that owing to tolerances involved in the manufacture of the components, it may be impossible to reduce the diameter of the portion 11 sufficiently to permit the limbs 12, 13 to lie in a common plane purely by reduction of the diameter of the portion 11. However, in this event of course the limbs 12, 13 will themselves flex.

The end of the drive member 17 remote from the window 14 is coupled to an electric motor 18 which drives the member 17 in the manner of a rack and pinion when the motor 18 is energized. Between the motor 18 and a point adjacent the lower edge of the window 14, when the window 14 is in a lowered position, the drive member 17 extends within a guide tube 19. Thus, when the motor 18 is operated, the drive member 17 is moved axially, and the axial movement of the member 17 is transmitted to the window 14 to raise or lower the window 14. The limbs 12, 13 of the device are themselves flexible, and so the device will absorb minor shock loadings in the drive system.

I claim:

1. An anchorage device for attaching a flexible drive member having a helically ribbed outer surface to a component to be driven, said device being formed from resilient material and including a helically-sound portion within which the drive member is received and a pair of outwardly extending limbs integral with said opposite ends respectively of the helically wound portion, through which the device can be secured to said component, the limbs being so arranged that a straight line passing through the points thereon at which the limbs are to be secured to the component extends at right angles across the axis of said helically wound portion.

* * * * *